United States Patent
Turan et al.

(10) Patent No.: US 12,208,507 B2
(45) Date of Patent: Jan. 28, 2025

(54) INTERVIEW ROBOT

(71) Applicant: ALTINBAS ÜNIVERSITESI, Istanbul (TR)

(72) Inventors: Fikret Korhan Turan, Istanbul (TR); Gül Coruh, Istanbul (TR)

( * ) Notice: Subject to any disclaimer, the term of this patent is extended or adjusted under 35 U.S.C. 154(b) by 146 days.

(21) Appl. No.: 17/998,373

(22) PCT Filed: Jun. 9, 2021

(86) PCT No.: PCT/TR2021/050561
§ 371 (c)(1),
(2) Date: Nov. 10, 2022

(87) PCT Pub. No.: WO2021/251937
PCT Pub. Date: Dec. 16, 2021

(65) Prior Publication Data
US 2023/0219232 A1     Jul. 13, 2023

(51) Int. Cl.
*B25J 13/08*     (2006.01)
*B25J 11/00*     (2006.01)
(Continued)

(52) U.S. Cl.
CPC ......... *B25J 11/0005* (2013.01); *B25J 13/003* (2013.01); *B25J 13/08* (2013.01); *G06Q 10/1053* (2013.01)

(58) Field of Classification Search
CPC ...... B25J 13/08; B25J 13/003; B25J 11/0005; G06Q 10/1053; G06Q 10/105
See application file for complete search history.

(56) References Cited

U.S. PATENT DOCUMENTS

| | | | |
|---|---|---|---|
| 7,113,848 B2 * | 9/2006 | Hanson | G16Z 99/00 700/258 |
| 11,684,517 B2 * | 6/2023 | Briand | A61H 3/061 348/62 |

(Continued)

FOREIGN PATENT DOCUMENTS

| | | |
|---|---|---|
| CN | 110900623 A | 3/2020 |
| CN | 111222854 A | 6/2020 |

(Continued)

OTHER PUBLICATIONS

Khosla et al., Innovative embodiment of job interview in emotionally aware communication robot, 2011, IEEE, p. 1546-1552 (Year: 2011).*

(Continued)

*Primary Examiner* — McDieunel Marc
(74) *Attorney, Agent, or Firm* — Egbert, McDaniel & Swartz, PLLC

(57) ABSTRACT

An interview robot that is used in the field of human resources (HR), characterized by comprising camera (U1), microphone (U2), odor sensor (U3), speaker (U4) and touch sensors (U5) enabling communication with the interviewed candidate, utility function determination memory (U6), which addresses the questions to the candidate so as to determine the parameters of the utility functions for the economic, social and environmental attributes of the candidate being interviewed, and stores the utility function parameters calculated with the answers received, the non-linear assignment program solution memory with uncertain utility functions (U7) that performs the best (optimal) job-personnel matching under different scenarios by simultaneously taking into account the situation in which employee satisfaction from the utility function determination memory varies in a mostly non-linear way in parallel with the (Continued)

economic, social and environmental characteristics of the candidate, and the uncertainties that may occur in employee satisfaction.

4 Claims, 3 Drawing Sheets

(51) Int. Cl.
    *B25J 13/00*     (2006.01)
    *G06Q 10/1053*     (2023.01)

(56) References Cited

U.S. PATENT DOCUMENTS

| | | | |
|---|---|---|---|
| 11,726,350 B2 * | 8/2023 | Sturm | G02C 7/068 351/159.42 |
| 2018/0018632 A1 | 1/2018 | Henmi | |

FOREIGN PATENT DOCUMENTS

| | | |
|---|---|---|
| TR | 201705553 A2 | 10/2018 |
| TR | 2019/15527 U | 1/2022 |

OTHER PUBLICATIONS

Duval et al., Questions to Improve Quality of Life with Wearables: Humans, Technology, and the World, 2006, IEEE, p. 1-10 (Year: 2006).*

Stewart et al., Dystechnia: A model of technology deficiency and implications for entrepreneurial opportunity, 2013, IEEE, p. 888-905 (Year: 2013).*

Haber et al., Task-Enabling CEOs: Implications for an Effective Implementation of New Technology, 2019, IEEE, p. 2723-2737 (Year: 2019).*

International Search Report and Written Opinion of the International Searching Authority for corresponding PCT/TR2021/050561 dated Aug. 13, 2021.

* cited by examiner

Conversion of monetary values to utility values

| Salary/Monetary value (TL) | 0 | 3,000 | 6,000 | 8,000 | 10,000 |
|---|---|---|---|---|---|
| Utility values of the candidate | 0 | 0.25 | 0.5 | 0.75 | 1 |

INTERVIEW ROBOT

TECHNICAL FIELD

The invention relates to a humanoid interview robot used in the field of human resources (HR), which can conduct job interviews.

STATE OF THE ART

Today, mostly human resources specialists are responsible for conducting job interviews. Although the employment process has been automated in recent years, especially in large companies, these processes focus only on the technical competencies and financial expectations of the candidates. That is, the non-financial expectations and satisfaction levels of most of the candidates are being neglected. Standard psychology tests are used to determine personality type in some cases; nevertheless, it should be noted that there may be uncertainties in such assessments due to measurement errors or changes based on experience and time.

Human resources automation and development of interview robots is a fairly new topic. The number of applications in this field are limited in terms of practical use and such applications mostly depend on creating a personality inventory or determination of utility function types and parameters. Therefore, assignment programs with certain utility functions are used for optimal employment.

The abstract of the patent application numbered 2017/05553 that emerged as a result of technical studies is as follows: "The invention relates to a simulation system that allows users to experience a job interview through a user interface resembling virtual reality. The system according to the invention consists of user interface unit, server, interview information database, language processing unit, behavior analysis unit, virtual interview unit, reporting unit and social media integration unit." As can be seen, the system relates to a system that allows users to obtain job interview experience, and it does not mention a structure that can provide a solution to the disadvantages mentioned above.

The abstract of the patent application numbered 2019/15527 that emerged as a result of technical research is also as follows: "This invention relates to a human resources recruitment and job application cabinet that provides the personal information requested by the human resources with the microphone, loudspeaker, camera devices located in the cabin within the artificial intelligence in order to prevent laziness and misspellings by entering the job seekers, and ensures that the received data is transmitted to the human resources unit. Human resources recruitment and job application cabinet allows the human resources unit to prevent the information requested from job seekers, misspellings and lack of information due to laziness in writing and provides ergonomics in the personnel selection processes of the human resources unit by transferring the personal information and visuals of the job seekers to the human resources unit.

As can be seen, the system relates to human resources recruitment and job application cabinet, and it does not mention a structure that can provide a solution to the disadvantages mentioned above.

In conclusion, due to the abovementioned disadvantages and lack of solutions thereto, a development has been deemed necessary regarding the relevant art.

The Object of the Invention

The invention aims to provide a structure having different technical features that are novel in this field, different from the embodiments used in the known state of art.

The primary object of the invention is to save both time and cost by automating the interview process by means of interview robots, and to enable the candidates to be evaluated objectively and analytically.

An object of the invention is to test the technical competencies of the candidates to be employed with the humanoid interview robot, determine and measure their financial and non-financial expectations, and use this information to provide optimal recruitment functions to increase both employee satisfaction and company productivity.

Benefits of the interview robot according to the invention are as follows:
  Time and cost savings with automation in job placement,
  Unbiased and objective recruitment through the use of analytical methods in employment
  Gathering all kinds of information about the candidates to be recruited and using them optimally or in the best way in the decision process (for example; to test the technical competencies of the candidates to be employed with the humanoid interview robot, determine and measure their financial and non-financial expectations, and to use this information to provide optimal recruitment functions to increase both employee satisfaction and company productivity).
  Taking into account uncertainties that may occur in the value of any measurement made when recruiting candidates under different scenarios.

Present art or method has been developed by adding the uncertainty factor to the previous approaches in the interview robot according to the invention. In this regard, the uniqueness of the invention is highlighted with the non-linear assignment program solution memory element involving uncertain utility functions.

The invention, designed to realize the objects mentioned above, is an interview robot used in the field human resources (HR), and it is characterized by comprising
  Camera, microphone, odor sensor, speaker and touch sensors that enable communication with the interviewed candidate,
  The utility function determination memory, which directs the questions to be asked to the candidate for the purpose of determining the parameters of the utility functions for the economic, social and environmental qualities of the candidate being interviewed, and which stores the utility function parameters calculated with the answers received,
  The nonlinear assignment program solution memory with uncertain utility functions that performs the best (optimal) job-personnel matching under different scenarios by simultaneously taking into account the situation in which employee satisfaction from the utility function determination memory varies in a mostly non-linear way in parallel with the economic, social and environmental characteristics of the candidate, and the uncertainties that may occur in employee satisfaction.

Structural and characteristic features of the invention and all the advantages it provides will be understood more precisely with the figures hereinbelow and the detailed explanation with references to these figures; for this reason, the evaluation should be made by taking these figures and detailed explanation into consideration.

FIGURES FOR A BETTER UNDERSTANDING OF THE INVENTION

Figure 1:
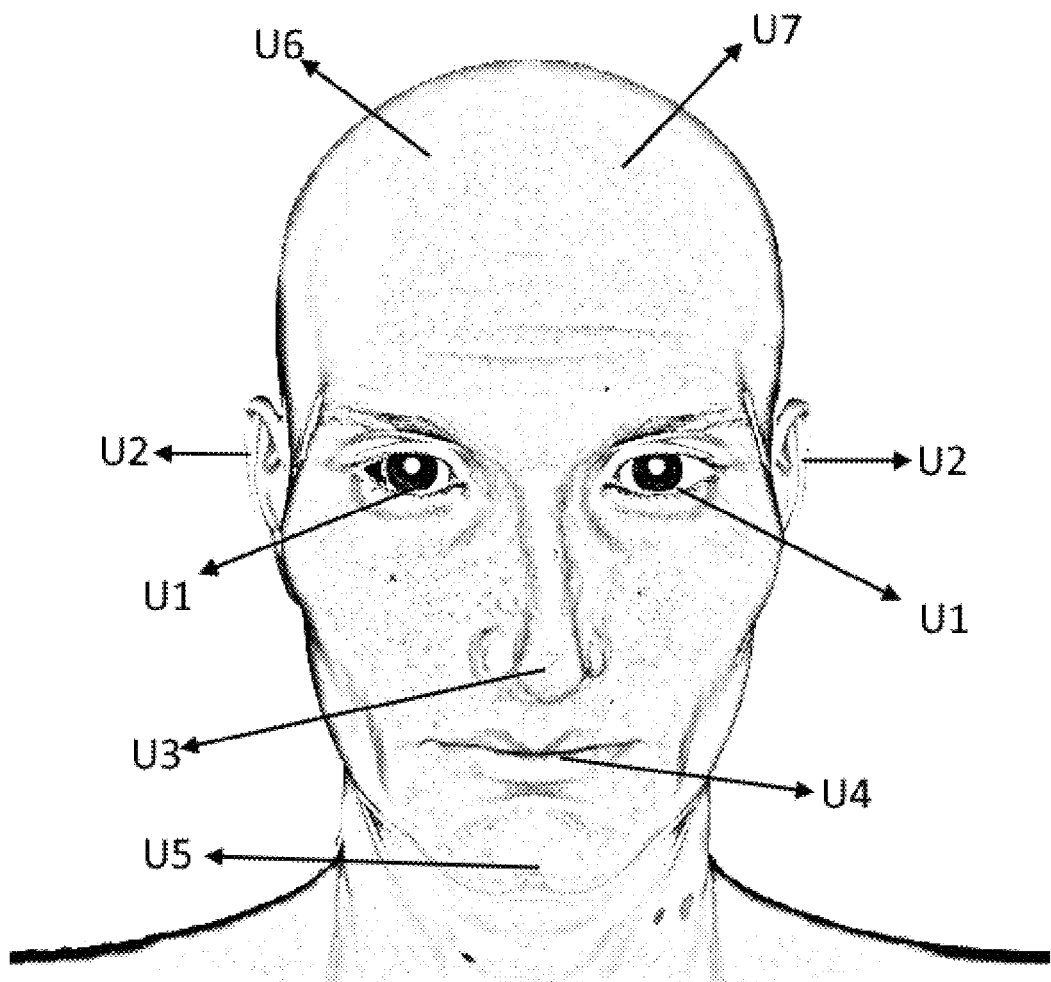
FIG. 1 is a representational view of the interview robot according to the invention.
Figure 2:
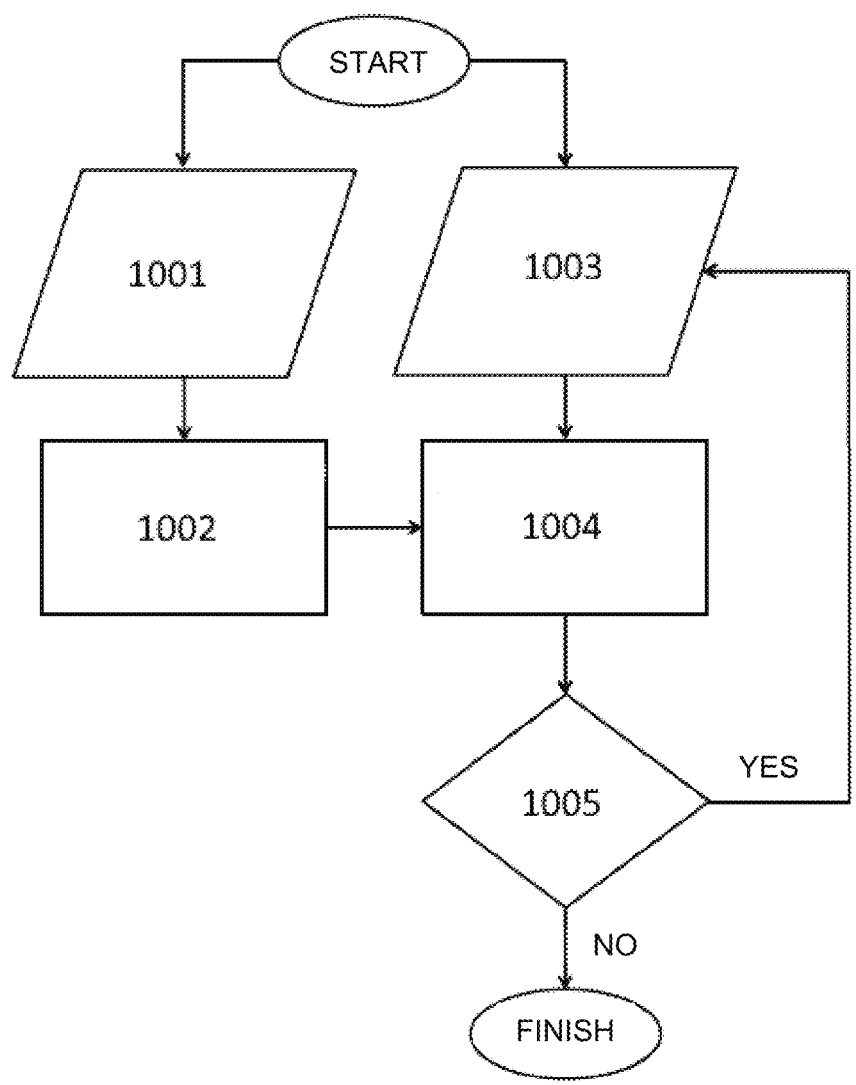
FIG. 2 is a schematic view of the process steps performed with the interview robot according to the invention.

The drawings are not necessarily drawn to scale and the details which are not necessary for the understanding of the present invention may be omitted. In addition, the elements that are substantially identical or have substantially identical functions are denoted by the same reference signs.

LIST OF THE REFERENCE NUMBERS

U1. Camera
U2. Microphone
U3. Odor sensor
U4. Speaker
U5. Touch sensors
U6. Utility function determination memory
U7. Non-linear assignment program solution memory with uncertain utility functions
1001. Candidates answer the questions asked with the purpose of determining their technical qualifications and utility functions for economic, social and environmental qualities by providing their identity information, verbally or in writing, and recording this information in the database,
1002. In the utility function determination memory (U6), based on the answers given to the abovementioned questions, the candidates' utility functions for economic-social-environmental characteristics are expressed with mathematical parameters in four different structures: linear, concave, convex and s-shaped, and this information is stored in the database,
1003. Using his/her own interface, the human resources specialist enters the economic, social and environmental return values for certain positions, the statistical distribution and variance values representing the uncertainties, together with the relevant assumptions/scenarios,
1004. A certain number of candidates with the highest technical competence are recruited in such a way as to maximize/optimize the total utility value of the candidates and reflect the results to the human resources interface using the nonlinear assignment program solution memory with uncertain utility functions (U7) in line with the data entered by the human resources specialist and the data collected in the utility function determination memory,
1005. It is questioned whether to continue the analysis.

DETAILED DESCRIPTION OF THE INVENTION

In this detailed description, the preferred embodiments of the invention are merely described for a better understanding of the subject matter and without any limiting effect.

The invention relates to a humanoid interview robot used in the field of human resources (HR), which can conduct job interviews.

Communication with the candidate interviewed by the interview robot according to the invention is provided via camera (U1), microphone (U2), odor sensor (U3), speaker (U4) and touch sensors (U5). The camera (U1) is preferably mounted on the eye of the interview robot, microphone (U2) is mounted on the ears, odor sensor (U3) is mounted on its nose, speaker (U4) is mounted on its mouth, and touch sensors (U5) are mounted on its chin or synthetic skin. These elements enable the candidate to respond verbally or in writing to the questions asked to determine the utility functions for economic, social and environmental qualities by specifying his/her identity information.

Apart from their technical capabilities, U1, U2, U3, U4 and U5 elements are customized to collect all kinds of visual, auditory, tactile, etc. data about the candidate so as to include qualifications or competencies such as the candidate's appearance, his/her self-care treatment, stress status, etc. in the decision-making process.

Camera (U1): Records the images of the candidate.

Microphone (U2): Records the candidate's speeches and answers to the questions asked. Odor sensor (U3): Records the odors that may be related to the candidate. For example, this element is used for determining whether the candidate smokes.

Speaker (U4): Addresses questions to the candidate.

Touch sensors (U5): Records information about the candidate such as fingerprint, body temperature, sweating, etc. For example, this element is used for determining the stress level of the candidate or whether he/she is lying (using a similar approach with lie detector).

These applications require the legal permission or approval of the candidates, and maximum attention should be paid to the protection of personal data within the framework of relevant laws and ethical values.

The utility function determination memory (U6) that is present on the interview robot directs the questions to be asked to the candidate for the purpose of determining the parameters of the utility functions for the economic, social and environmental qualities of the candidate being interviewed, and which stores the utility function parameters calculated with the answers received.

The nonlinear assignment program solution memory with uncertain utility functions (U7) performs the best (optimal) job-personnel matching under different scenarios by simultaneously taking into account the situation in which employee satisfaction from the utility function determination memory varies in a mostly non-linear way in parallel with the economic, social and environmental characteristics of the candidate, and the uncertainties that may occur in employee satisfaction.

Following example can be given in order to better understand the operating principle of the interview robot according to the invention: Assuming that there are 10 open positions that require different technical competencies and offer different levels of economic-social-environmental benefits. The interview robot developed for the recruitment in these positions makes an interview with the candidates. The robot determines top 10 candidates with the highest technical competencies. It then asks each of these candidates questions to determine their economic-social-environmental utility functions. The questions addressed for determining the utility functions are based on a common lottery game: For example, let's take the issue of economic benefits, namely salary. The interview robot asks the following questions to the candidate in order to determine the utility of a salary of 6,000 TL (Turkish Lira) for the candidate interviewed:

Interview Robot: Which of the following would you prefer?
A: A 6,000 TL check in cash
B: A lottery ticket with a probability of 0.5 of 0 TL or a probability of 0.5 of 10,000 TL
C: I can't choose between two options.

If the candidate chooses the option C, that is, if the candidate can't choose between a lottery ticket with a probability of 0.5 of 0 TL or a return of 10,000 TL with a probability of 0.5, and a 6,000 TL check, the utility of 6,000 TL for the candidate is calculated as follows:

Utility (6,000 TL)=0.5*Utility (0 TL)+0.5*Utility (10,000 TL)=0.5*0+0.5*1=0.5

At this point, the utility value of the smallest amount of 0 TL and the largest amount of 10,000 TL are considered 0 and 1, respectively.

If the candidate chooses the option A, the same question is asked again, increasing the probability of winning 10,000 TL (for example, a lottery ticket with a probability of 0.25 of 0 TL or a probability of 0.75 with a return of 10,000 TL). If the candidate chooses the option B, the same question is asked again, this time, increasing the probability of 0 TL (for example, a lottery ticket with a probability of 0.75 with a return of 0 TL or a probability of 0.25 of 10,000 TL). The candidate is continued to be asked the questions until being undecided between two options.

Figure 3:
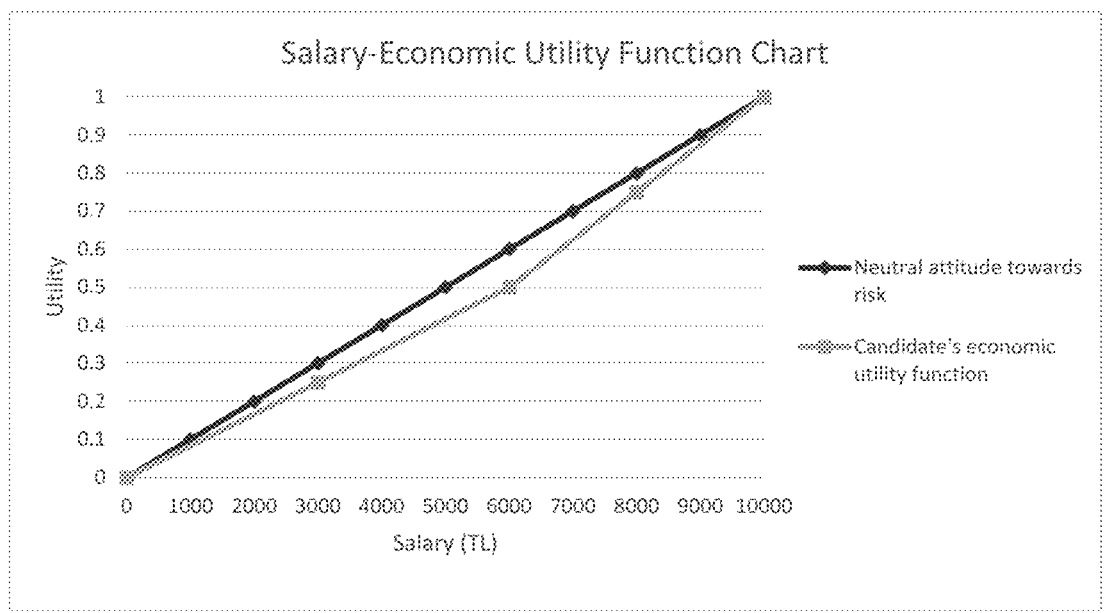
FIG. 3 is a table and corresponding graph showing the salary-economic utility function of the interview robot according to the invention.

By following a similar procedure, let's assume that the benefits of 3,000 TL and 8,000 TL for the candidate are calculated and graphed as shown in FIG. 3. The figure shows that the candidate's economic benefit function (compared to the linear risk-neutral benefit function) is convex. Therefore, it is concluded that the candidate is willing to take risk.

Similarly, the non-financial (ie, social-environmental) attributes of the positions are also digitized by being rated from 1 to 10 in line with their severity and the interview robot asks various lottery questions in order to determine their utility functions regarding the said attributes. For example, let's take the issue of educational opportunities. In the event that the candidate is undecided between a position that offers 0 level with 0.5 probability, and 10 level with 0.5 probability, and a position that certainly offers training opportunities at 4 level with no other probability, the utility of level 4 to the candidate is calculated as follows:

Utility (4)=0.5*Utility (1)+0.5*Utility (10)=0.5*0+ 0.5*1=0.5

At this point, the utility value of the smallest amount of 1 and the largest amount of 10 are considered 0 and 1, respectively. If the candidate certainly chooses one of these alternative positions, the probabilities are updated pursuant to the answers given by the candidate until he/she is undecided.

In conclusion, the interview robot poses a series of lottery questions to the candidates for each economic-social-environmental qualification such as salary, overtime, company location, transportation benefits, training opportunities, working environment, compliance with corporate culture, etc. In this way, the utility functions of the candidates are formed as per the mentioned attributes.

As exemplified above, in the utility function determination memory (U6), based on the answers given to the abovementioned questions, the candidates' utility functions for economic-social-environmental characteristics are expressed with mathematical parameters in four different structures: linear, concave, convex and s-shaped; and this information is stored in the database. A linear utility function indicates neutrality to risk, while concave, convex, and s-shaped incremental utility functions indicate risk-averse, risk-seeking, or variable attitude towards risk, respectively.

In the literature, there are two similar approaches; namely, Certainty Equivalence and Probability Equivalence, regarding the questions addressed in order to determine utility functions or to determine the relevant function parameters. Any of the mentioned approaches can be adopted according to need or preference. The Probability Equivalence approach is used in the example given above.

Non-linear assignment program solution memory with uncertain utility functions (U7) takes into account both the technical requirements of the positions and the satisfaction levels of the candidates, which vary mostly non-linearly according to economic-social-environmental characteristics and recruits the optimal candidates to 10 open job positions (maximizing the total utility). During the recruitment, possible measurement error in the utility function parameters of the candidates or the uncertainties that may arise from experience, time and change are also taken into account in this regard.

Process steps of the method applied with the interview robot according to the invention are as follows:

Candidates answer the questions asked with the purpose of determining their technical qualifications and utility functions for economic, social and environmental qualities by providing their identity information, verbally or in writing, and recording this information in the database (1001), (As mentioned above, U1, U2, U3, U4 and U5 elements are customized in order to collect all kinds of visual, auditory, tactile, etc. data about the candidates. Therefore, qualifications or competencies such as the candidate's appearance, his/her self-care treatment, stress status, etc. can be included in the decision-making process.)

In the utility function determination memory (U6), based on the answers given to the abovementioned questions, the candidates' utility functions for economic-social-environmental characteristics are expressed with mathematical parameters in four different structures: linear, concave, convex and s-shaped, and this information is stored in the database (1002), Using his/her own interface, the human resources specialist enters the economic, social and environmental return values for certain positions, the statistical distribution and variance values representing the uncertainties, together with the relevant assumptions/scenarios (1003), A certain number of candidates with the highest technical competence are recruited in such a way as to maximize the total utility value of the candidates and reflect the results to the human resources interface using the nonlinear assignment program solution memory with uncertain utility functions (U7) in line with the data entered by the human resources specialist and the data collected in the utility function determination memory (1004), And it is questioned whether to continue the analysis (1005).

If not continued, the analysis is concluded,

If continued, the processing step 1003 is repeated.

The mathematical representation of the nonlinear assignment program with uncertain utility functions is expressed as follows:

Parameters:

P: Position set

A: Candidate cluster

M: Number of elements in sets P and A

N: Number of attributes $\omega$: Any random realization for parameters with uncertainty $f_{pan}(\omega)$: Utility of attribute n for candidate a placed in position p $f_{pa}(\omega)$: Total utility to be gained by candidate a placed in position p $k_{an}(\omega)$: Significance of attribute n relative to candidate a ($0 \leq k_{an}(\omega) \leq 1$)

$k_a(\omega)$: Scaling coefficient for $k_{an}(\omega)$ values of candidate a $k_{anr}(\omega)$: Coefficient showing the interaction between attributes n and r with respect to candidate a:

$k_{anrs}(\omega)$: Coefficient showing the interaction among attributes n, r and s with respect to candidate a $K_{a123...N}(\omega)$: Coefficient showing the interaction among attributes 1, 2, 3 ... N with respect to candidate a $F_{abc...h}(\omega)$: Utility of employer from assignment type abc ... h (a, b, c, ..., h ∈ A and a≠b≠c≠ ... ≠h)

F: Minimum or threshold utility value that the employer wants to gain

Decision Variables:

$y_{pa}$: $\begin{cases} 1 & \text{If candidate } a \text{ is placed in position } p \text{ such that } p \in P \text{ ve } a \in A \\ 0 & \text{Otherwise} \end{cases}$ Objective Function:

$$\text{Maks } Z = \sum_{p=1}^{M}\sum_{a=1}^{M} f_{pa}(\omega) \quad (1)$$

Under the assumption of additive utility independence, $$f_{pa}(\omega) = \sum_{n=1}^{N} k_{an}(\omega) f_{pan}(\omega) \quad (2)$$

such that, $$\sum_{n=1}^{N} k_{an}(\omega) = 1 \quad (3)$$

Under the assumption of mutual utility independence, $$f_{pa}(\omega) = \sum_{n=1}^{N} k_{an}(\omega) f_{pan}(\omega) + k_a(\omega)\sum_{\substack{n=1 \\ r>n}}^{N} k_{an}(\omega) k_{ar}(\omega) f_{pan}(\omega) f_{par}(\omega) + \quad (4)$$

$$k_a^2(\omega) \sum_{\substack{n=1 \\ r>n \\ s>r}}^{N} k_{an}(\omega) k_{ar}(\omega) k_{as}(\omega) f_{pan}(\omega) f_{par}(\omega) f_{pas}(\omega) +$$

$$\vdots$$

$$k_a^{N-1}(\omega) k_{a1}(\omega) k_{a2}(\omega) \ldots k_{aN}(\omega) f_{pa1}(\omega) f_{pa2}(\omega) \ldots f_{paN}(\omega)$$

such that, $$1 + k_a(\omega) = \prod_{n=1}^{N}[1 + k_a(\omega) k_{an}(\omega)] \quad (5)$$

Under the assumption of utility independence, $$f_{pa}(\omega) = \sum_{n=1}^{N} k_{an}(\omega) f_{pan}(\omega) + \sum_{n=1}^{N}\sum_{r>n} k_{anr}(\omega) f_{pan}(\omega) f_{par}(\omega) + \quad (6)$$

$$\sum_{n=1}^{N}\sum_{r>n}\sum_{s>r} k_{anrs}(\omega) f_{pan}(\omega) f_{par}(\omega) f_{pas}(\omega) +$$

$$\vdots$$

$$k_{a123...N}(\omega) f_{pa1}(\omega) f_{pa2}(\omega) f_{pa3}(\omega) \ldots f_{paN}(\omega)$$

Model Constraints:

$$\sum_{a=1}^{M} y_{pa} = 1 \quad (\text{for } \forall\, p) \quad (7)$$

$$\sum_{p=1}^{M} y_{pa} = 1 \quad (\text{for } \forall\, a) \quad (8)$$

$$F_{abc...h}(\omega) y_{1a} y_{2b} y_{3c} \ldots y_{Mh} \geq F \quad (9)$$

(for $a, b, c, \ldots, h \in A$ and $a \neq b \neq c \neq \ldots \neq h$)

$$y_{pa} \in \{0, 1\} \quad (\text{for } p \in P \text{ and } a \in A) \quad (10)$$

The mathematical representation of the family of utility functions used is expressed as follows:

$g_{pn}$: Return of attribute n of position p $g_n^{maks}$: Maximum return that can be obtained from attribute n $g_n^{min}$: Minimum return that can be obtained from attribute n $T_{an}(\omega)$: Parameter that ensures that the utility to be gained by candidate a from attribute n remains between the values of 0 and 1

$X_{an}(\omega)$: Parameter that determines the location on the x-axis of the inflection point of the utility function of candidate a with respect to attribute n $Y_{an}(\omega)$: Parameter that determines the location on the y-axis of the inflection point of the utility function of candidate a with respect to attribute n $Z_{an}(\omega)$: Parameter that determines the shape of the utility function (linear, concave, convex, or s-shaped) of candidate a with respect to attribute n $$f_{pan}(\omega) = T_{an}(\omega)\left[1 - e^{-Y_{an}(\omega)\left(\frac{|g_{pn} - g_n^{min}|y_{pa}}{X_{an}(\omega)}\right)^{Z_{an}(\omega)}}\right] \quad (11)$$

$$T_{an}(\omega) = \frac{1}{\left[1 - e^{-Y_{an}(\omega)\left(\frac{|g_n^{maks} - g_n^{min}|}{X_{an}(\omega)}\right)^{Z_{an}(\omega)}}\right]} \quad (12)$$

TABLE 2

Parameter values that can be used to create different types of increasing utility functions

| Function | $X_{an}(\omega)$ | $Y_{an}(\omega)$ | $Z_{an}(\omega)$ |
|---|---|---|---|
| Linear | $X_{an}(\omega) \approx g_n^{min}$ | $\approx 0$ | $\approx 1$ |
| Concave | $g_n^{min} + \dfrac{g_n^{maks} - g_n^{min}}{2} < X_{an}(\omega) < g_n^{min}$ | $< 0.5$ | $> 1$ |
| Convex | $g_n^{min} < X_{an}(\omega) < g_n^{min} + \dfrac{g_n^{maks} - g_n^{min}}{2}$ | $> 0.5$ | $< 1$ |
| S-shaped | $g_n^{min} + \dfrac{g_n^{maks} - g_n^{min}}{5} < X_{an}(\omega) < g_n^{min} + (g_n^{maks} - g_n^{min}) * \dfrac{4}{5}$ | $0.2/0.8$ | $> 1$ |

The invention claimed is:

1. An interview robot that is used in the field of human resources (HR), the interview robot comprising:
   a camera, a microphone, an odor sensor, a speaker and touch sensors that enable communication with an interviewed candidate;
   a utility function determination memory, which directs questions to be asked to the candidate for the purpose of determining parameters of the utility functions for economic, social and environmental qualities of the candidate being interviewed, and which stores the utility function parameters calculated with answers received;
   a nonlinear assignment program solution memory with uncertain utility functions that performs the best (optimal) job-personnel matching under different scenarios by simultaneously taking into account the situation in which employee satisfaction from the utility function determination memory varies in a mostly non-linear way in parallel with the economic, social and environmental characteristics of the candidate, and the uncertainties that may occur in employee satisfaction.

2. The interview robot according to claim 1, wherein the utility function determination memory retains the mathematical parameters, in which the candidates' utility functions for economic-social-environmental characteristics are expressed in four different structures: linear, concave, convex and s-shaped; based on the answers given to the abovementioned questions.

3. The interview robot according to claim 1, wherein:
   the camera records images of the candidate;
   the microphone records the candidate's speeches and answers to the questions;
   the odor sensor records odors that may be related to the candidate;
   the speaker addresses questions to the candidate; and
   the touching sensors record information about the candidate such as fingerprint, body temperature, and sweating.

4. A method that can be performed via the interview robot of claim 1 that is used in the field of human resources, the method comprising the following process steps:
   candidates answer the questions asked with the purpose of determining their technical qualifications and utility functions for economic, social and environmental qualities by providing their identity information, verbally or in writing, and recording this information in the database (1001);
   in the utility function determination memory, based on the answers given to the abovementioned questions, the candidates' utility functions for economic-social-environmental characteristics are expressed with mathematical parameters in four different structures: linear, concave, convex and s-shaped, and this information is stored in the database (1002);
   using his/her own interface, the human resources specialist enters the economic, social and environmental return values for certain positions, the statistical distribution and variance values representing the uncertainties, together with the relevant assumptions/scenarios (1003);
   a certain number of candidates with the highest technical competence are recruited in such a way as to maximize the total utility value of the candidates and reflect the results to the human resources interface using the nonlinear assignment program solution memory with uncertain utility functions in line with the data entered by the human resources specialist and the data collected in the utility function determination memory (1004); and
   it is questioned whether to continue the analysis (1005).

* * * * *